United States Patent [19]

Harris

[11] Patent Number: 4,787,793
[45] Date of Patent: Nov. 29, 1988

[54] BOLT GUARD

[75] Inventor: Gary R. Harris, Fairfield, Ill.

[73] Assignee: Terrell Lee Sharp, Mt. Vernon, Ill.; a part interest

[21] Appl. No.: 30,637

[22] Filed: Mar. 27, 1987

[51] Int. Cl.$^4$ ............................................. F16B 21/00
[52] U.S. Cl. ................................ 411/339; 411/908; 174/45 R; 174/138 D; 403/408.1; 403/388
[58] Field of Search ............... 411/339, 338, 908, 533, 411/910; 403/408.01, 388, 289, 310, 313; 52/697, 40

[56] References Cited

U.S. PATENT DOCUMENTS

| Re. 27,085 | 3/1971 | Weidner, Jr. . | |
| 625,230 | 5/1899 | Wiont | 411/338 |
| 2,614,729 | 10/1952 | Jung | 411/339 X |
| 2,723,048 | 11/1955 | Welch . | |
| 2,915,152 | 12/1959 | Graham . | |
| 3,299,766 | 1/1967 | Gould et al. . | |
| 3,339,953 | 9/1967 | Bohn | 411/339 X |
| 3,457,823 | 7/1969 | Dillon | 411/366 |
| 3,541,917 | 11/1970 | VanDouwen et al. . | |
| 3,889,569 | 6/1975 | Fanciullo . | |
| 4,310,273 | 1/1982 | Kirrish . | |
| 4,490,083 | 12/1984 | Rebish | 411/338 |
| 4,582,462 | 4/1986 | Thiel . | |

FOREIGN PATENT DOCUMENTS

| 459202 | 4/1928 | Fed. Rep. of Germany ... 174/138 D |
| 1183978 | 12/1964 | Fed. Rep. of Germany ... 174/138 D |
| 1066039 | 6/1954 | France ........................... 403/408 |

Primary Examiner—Gary L. Smith
Assistant Examiner—Curtis B. Brueske
Attorney, Agent, or Firm—Jones, Tullar & Cooper

[57] ABSTRACT

A bolt guard assembly utilizes a central sleeve and first and second end caps to separate a metal fastening nut and bolt from a pair of wood products that have been treated with a preservative. The bolt guard assembly is formed of a plastic material and prevents the metal fastener from coming into contact with the treated wood products. The central sleeve is sized to telescopingly receive crimped barrel ends of the two end caps. Each of these end caps is structured having a fastener head or nut receiving pocket which receives the head or nut of the fastener and isolates them from the wood. Fastener life is greatly increased through use of the bolt guard assembly.

10 Claims, 1 Drawing Sheet

BOLT GUARD

FIELD OF THE INVENTION

The present invention is directed generally to a guard or protector for a bolt. More particularly, the present invention is directed to a multi-part plastic guard or protective assembly for a bolt. Most specifically, the present invention is directed to a multi-part plastic guard or protective assembly which will protect a metal bolt and nut from the destructive effects of wood preserving salts or chemicals. These chemicals, which are utilized as wood treating or preserving agents, particularly in utility poles and crossarms, are very satisfactory for use as wood preservatives. However, they are highly destructive of metal fastening hardware such as aluminum or galvanized nuts and bolts. The bolt guard or protective assembly of the present invention effectively separates the bolt and nut assembly from the preservative treated wood thereby substantially extending fastener life and reducing replacement costs.

DESCRIPTION OF THE PRIOR ART

Various preservatives and treating agents have long been applied to wooden timbers and poles to prevent deterioration of the wood due to the effects of weather, boring insects, and the like. In the past, various treatment agents such as creosote, oils and the like were applied to these timbers and poles. Typical useages of these treated wood products have often required the joining of two or more of such timbers or beams together, such as when these wood products have been utilized as utility poles, in earth retaining walls, and in various other structural and architectural applications. The joining of these various wood products to each other has conventionally been accomplished by the use of nut and bolt assemblies wherein the nuts, bolts, and any needed washers have been typically made of steel or galvanized iron. These fastener materials were not harmed by the various treatment and preservative agents that have been used in the prior art.

Recently promulgated regulations have changed the types of treatment materials that are acceptable from an environmental standpoint for use in the treatment of wood products. Chemical and salt based preservatives and treatment agents will soon become industry standards. While these newly mandated treating compositions and preservatives are not harmful to the environment, they have had a substantial effect on the types of fasteners that can be used to join the treated wood products to each other. It appears that the chemical treatment agents and salts that are about to become standard in the industry have a destructive effect on steel and galvanized bolts and nuts. Thus fastener deterioration is much greater than was the case when the older, more traditional creosotes and the like were used as treating agents.

Aluminum bolts and nuts are destroyed by the new treating agents at a faster rate than are galvanized bolts and nuts, which are also destroyed quite rapidly. The use of alternative materials, such as stainless steel for the fasteners is economically unfeasable. The solution, in accordance with previously known procedures, has been the periodic replacement of the various fasteners before they are caused, by contact with the newer salts and chemical materials, to deteriorate to a point where they become subject to failure. As will readily be appreciated, such periodic replacement of all the nuts and bolts used to secure crossarms to utility poles, or to secure various elements of an earth retaining wall together, or in other such typical applications of treated wood products, is essentially impossible. Even if the nuts and bolts are accessible, such as in utility poles, the cost in terms of man hours makes the job unfeasable.

The use of these recently mandated salt and chemical wood product treatment materials has had a significant, adverse impact on the useability of these wood products where they must be joined or secured together. There clearly exists a need for a solution to the problem of the incompatibility of these new wood treatment materials with presently commercially available fasteners so that treated wood products will remain a cost effective material. The bolt guard or protector in accordance with the present invention provides such a solution.

SUMMARY OF THE INVENTION

It is an object of the present invention to provide a bolt guard or protective assembly.

Another object of the present invention is to provide a bolt guard or protector useable with treated wood products.

A further object of the present invention is to provide a bolt guard or protective assembly which separates treated wood products from metal fastening devices.

Yet another object of the present invention is to provide a bolt guard or protective assembly formed of light weight, durable plastic material.

Still a further object of the present invention is to provide a bolt guard or protective assembly that is readily adaptable to various bolt lengths and sizes.

Even yet another object of the present invention is to provide a bolt guard or protective assembly that is easy to assembly, inert, and not affected by various wood treating and preserving chemicals and salts.

As will be discussed in greater detail, in the description of the preferred embodiment which is set forth subsequently, the bolt guard or protective assembly in accordance with the present invention is comprised generally of a central hollow plastic tube or sleeve, and two end caps, a first such end cap for the head end of a bolt or similar fastener, and a second end cap for the nut or threaded end of the fastener. The two end caps have bolt head or nut and washer receiving pockets that are joined to short, fastener shank receiving barrels. These barrels have crimped free ends which are sized to be telescopingly receivable within the ends of the central hollow plastic tube. Various sizes and lengths of central tubes and end caps are available to cooperate with various fastener sizes that are typically used.

Bolt receiving holes, which are drilled in the treatment wood products to be joined together, are sized to have a diameter larger than that of the fastener to be used. The central plastic tube or sleeve may be inserted through the aligned bores in the assembled wood elements and the two end caps, which may have a sealant or a glue applied to their crimped ends, are joined to the central tube. The shank of the bolt is passed through the central tube. The bolt head and a washer are received in the head end cap and a washer and nut are secured to the opposite end of the bolt. As the bolt is tightened down, it contacts the end caps which telescope inwardly toward each other.

The bolt guard or protective assembly in accordance with the present invention effectively separates the metal securement means from the treated wood product. The plastic tube and end caps are inert and do not harm the metal bolt, nut and washer. At the same time, this plastic fastener guard or protector assembly prevents any of the treatment salts or chemicals from coming into contact with the metal fastener. This ensures that the fastening assembly will not deteriorate and thus does not have to be periodically replaced. The plastic central tube and end caps are also not harmed by the treating salts or chemicals and thus do not require replacement. Thus the fasteners and the bolt guard assembly are good for the life of the wood products.

The bolt guards or protective assembly in accordance with the present invention effectively solves the problem of fastener deterioration and damage that has been a result of the utilization of new, ecologically acceptable wood treating and preserving chemicals. By using the subject bolt guard assembly, users of treated wood products can continue to use these materials without fear of fastener failure. The bolt guard assembly thus provides a realistic, cost effective solution to the problem of treatment material induced fastener deterioration.

BRIEF DESCRIPTION OF THE DRAWINGS

While the novel features of the bolt guard assembly of the present invention are set forth with particularity in the appended claims, a full and complete understanding of the invention may be had by referring to the detailed description of the preferred embodiment, and is set forth hereinafter, and as is illustrated in the accompanying drawings in which:

DESCRIPTION OF THE PREFERRED EMBODIMENT

Figure 1:
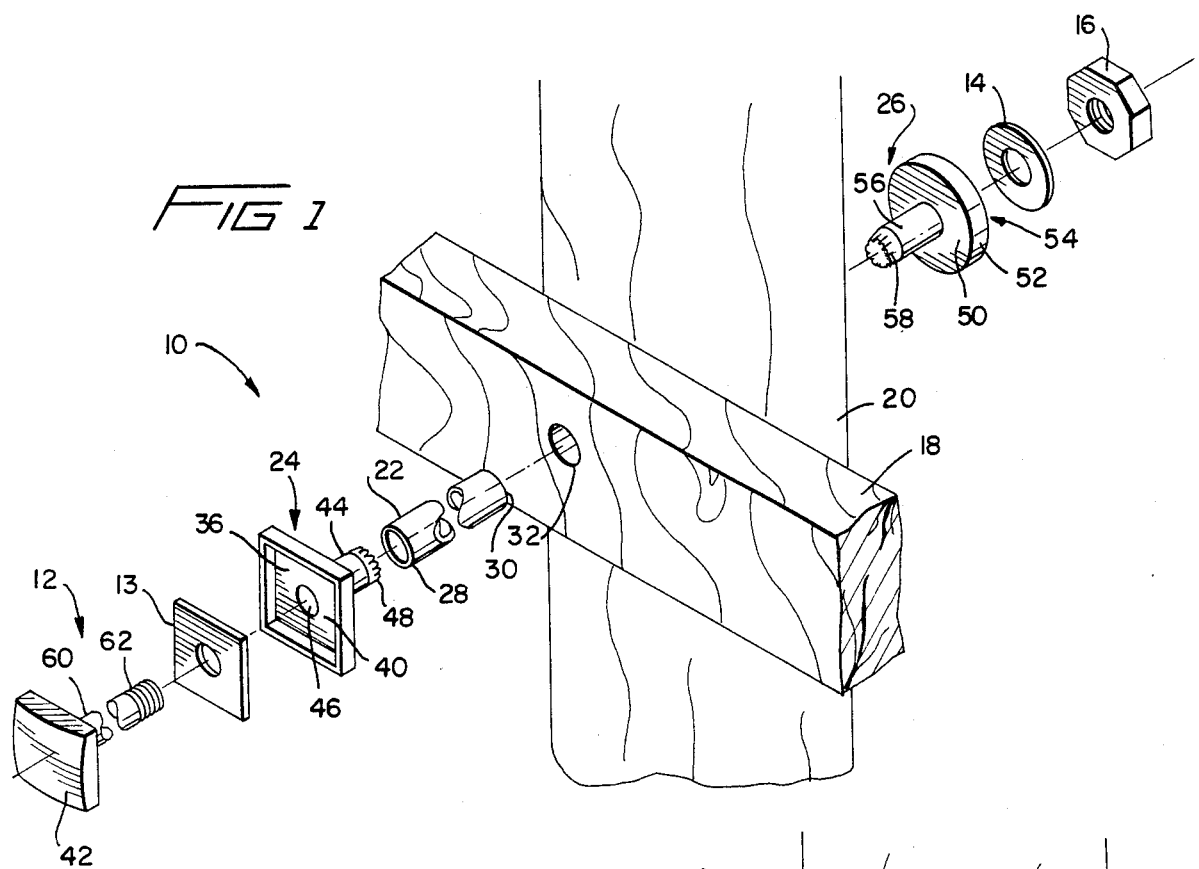
FIG. 1 is a exploded perspective view of the bolt guard assembly in accordance with the present invention as it is being utilized to join a crossarm to an upright utility pole.

Turning initially to FIG. 1, there may be seen generally at 10 a preferred embodiment of a bolt guard or protective assembly in accordance with the present invention. In FIG. 1, bolt guard assembly 10 is shown in an exploded perspective view as it would be employed in conjunction with a threaded bolt 12 that cooperates with washers 13 and 14 and nut 16 to secure a treated wood crossarm 18 to a treated wood utility pole 20. While bolt guard assembly 10 will hereinafter be discussed and described in use with a treated wooden utility pole and crossarm, it will be understood that this is only one of the many situations in which bolt guard assembly 10 may well find use. Wherever a pair of wood products, which have been treated with salts or chemical preservatives, are to be joined together, the bolt guard assembly 10 of the present invention may be beneficially employed.

Referring again to FIG. 1, bolt guard assembly 10 is comprised of three cooperating members, a center tube or sleeve 22, a first or bolt head end cap 24, and a second or nut end cap 26. All three of these components are formed of plastic of a suitable, inert composition which is impermeable and is not harmed by contact with wood treating salts or chemicals. Suitable plastics may include polyethylene, polypropylene or poly vinyl chlorides. The specific plastic is not important so long as it meets the above criteria.

Figure 3:
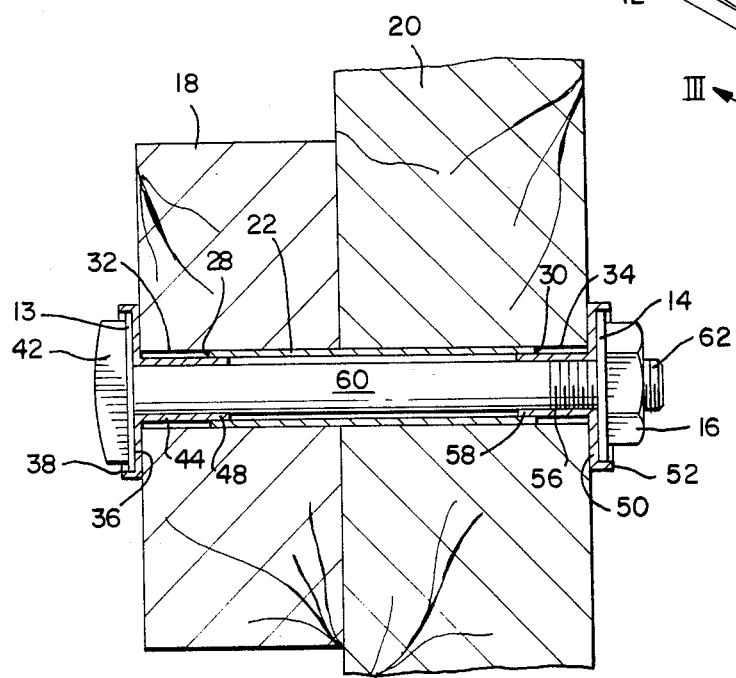
FIG. 3 is a side elevation view, partly in cross section, and taken along line III—III of FIG. 2.

Center tube or sleeve 22 is, as may be seen in FIGS. 1 and 3, generally cylindrical and terminates in a head end cap receiving end 28 and a nut end cap receiving end 30. This sleeve 22 may be supplied in various diameters and in elongated straight lengths or coils that can then be cut to the desired length. As is shown most clearly in FIG. 3, sleeve 22 is positioned, in use, within aligned bores 32 and 34 in crossarm 18 and utility pole 20, respectively. Sleeve 22 is sized to slidably fit within bores 32 and 34, as will be discussed in greater detail subsequently.

Bolt head end cap 24 and nut end cap 26 are both quite similar and may be substituted one for the other, as dictated by the shape of the bolt 12 or nut 16 being used. As seen in FIGS. 1 and 3, bolt head end cap 24 has a generally rectangular planar bolt head receiving member 36. This member's surface is bordered by a upstanding rim 38 so that bolt head receiving member 36 and upstanding rim 38 cooperate to form a bolt head receiving pocket 40. This pocket serves to receive the head 42 of bolt 12 and bolt head washer 13. A tubular barrel 44 extends from the bolt head receiving member 36 on the side thereof opposite to rim 38. Barrel 44 is formed about a central aperture 46 in bolt head receiving member 36 and has a crimped free end 48. As may be seen most clearly in FIG. 3, crimped barrel end 48 of barrel 44 is sized to be telescopingly slideable within central tube or sleeve 22. The crimped end 48 of barrel 44 acts as a guide when inserting barrel 44 into the head end cap receiving end 28 of central sleeve or tube 22 and also limits the depth of insertion. If desired, a glue or sealant can be applied to crimp 48 prior to its insertion into tube end 28.

As may also be seen in FIGS. 1 and 3, nut end cap 26 is formed having a generally circular planar nut and washer receiving member 50 that is bordered by an upstanding rim 52. Nut and washer receiving member 50 and upstanding rim 52 cooperate to form a nut or washer pocket 54 which will receive both washer 14 and nut 16. A tubular barrel 56 extends from nut receiving member 50 opposite in direction to rim 52. This barrel 56 also terminates in a crimped free end 58, in a manner similar to crimped end 48 of barrel 44 of head end cap 24. Also in a similar manner, crimped end 58 of nut end cap 26 slides into the nut end cap receiving end 30 of the central tube or sleeve 22. A glue or sealant may also be applied to crimped end 48 of nut end cap barrel 56 prior to its insertion into sleeve 22.

Figure 2:
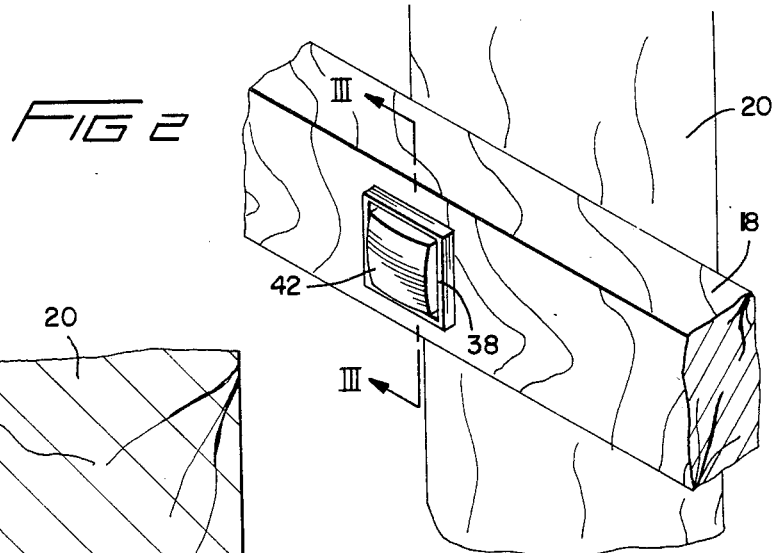
FIG. 2 is an assembled perspective view of the crossarm and pole of FIG. 1 with the bolt guard assembly and fastener in place.

In a typical useage, as may be seen in FIGS. 1, 2, and 3 wherein a first treated wood product, such as a crossarm 18, is to be secured to a second treated wood product, such a utility pole 20, the two treated wood product members are positioned so that their previously formed bores 32 and 34 are aligned. The crimped end 48 of the barrel 44 of a first end cap 24 is slid into a first end 28 of a central tube or sleeve 22 whose length has been selected in accordance with the combined depth of bores 32 and 34. This assembly is then slid over the shank 60 of bolt 12 until bolt head 42 and bolt head washer 13 are received in bolt head receiving pocket 40 of first end cap 24. In the drawings, bolt head 42, bolt head washer 13 and bolt head receiving pocket 40 are all depicted as being rectangular. This is not always the case, as will be understood by those of skill in the art. If a round headed bolt and washer are being used, a bolt end cap 24 having a shape such as shown by second end cap 26 could be used. Alternatively a first end cap 24 having a rectangular pocket 40 could be used with a round headed bolt 12 and washer 13. The important criteria is that the bolt head receiving pocket 40 is to be large enough to accept the bolt head 42 and accompanying washer 13.

Once the bolt shank 60 has been passed through aperture 46 in the first end cap 24, through first end cap barrel 44, and through central tube 22, the assemblage can then be placed in aligned bores 32 and 34. Next, the crimped end 58 of the barrel 56 of the second end cap 26 is inserted into the second end 30 of sleeve 22, while using the threaded end 62 of bolt 12 as a guide. Once this has been done, the washer 14 and nut 16 may be secured and tightened into place. Again, as with first end cap 24, the specific shape of the pocket 54 in second end cap 26 is not of critical importance so long as it is large enough to accept washer 14 and nut 16.

As may be seen in FIG. 3, the length of central sleeve 22 and the barrels 44 and 56 of first and second end caps 24 and 26, respectively, insure that shank 60 of bolt 12 does not contact any of the treated wood products such as crossarm 18 and pole 20. The length of sleeve 22 is also selected so that the ends 28 and 30 of sleeve 22 do not abut the inner surfaces of the first and second end cap bolt or nut receiving members 36 and 50, respectively. This insures that the bolt and nut can be tightened without breaking or cracking the sleeve 22 or end caps 24 or 26.

As was alluded to previously, the diameter of the center tube or sleeve 22 is selected in accordance with the size of the shank 60 of bolt 12. Industry standards for utility poles and crossarms allow bores having a diameter of ⅛" greater than that of the intended bolt shank. Thus a sleeve 22 having an outside diameter 3/32" greater than the bolt shank 60 can be placed in the aligned bores 32 and 34. The thickness of the wall of sleeve 22 will be such that a clearance of at least 1/32" for bolts 5/16" and smaller and of at least 1/16" for bolts above ⅜" outside diameter will be provided. This will allow passage of the central sleeve through the aligned bores and of the bolt shank through the sleeve.

The bolt guard assembly in accordance with the present invention provides a practical, economical solution to the problem of fastener deterioration that has been caused by the useage of salt and chemical wooden product treatment and preserving agents. The central sleeve and end caps are quickly assemblable from inexpensive components and do not require a great deal of time to install. The bolt guard assembly separates the aluminum, galvanized metal or other bolts from the treated wood. The telescoping cooperation of the end caps with the central sleeve allows the bolt to be properly tightened without damaging the bolt guard assembly.

While a preferred embodiment of a bolt guard assembly in accordance with the present invention has been fully and completely set forth hereinabove, it will be apparent that various changes in, for example the types of plastics used for the components, the sizes of the cooperating elements, the types of fasteners and wood products fastened together, and the like could be made without departing from the true spirit and scope of the subject invention which is accordingly to be limited only by the following claims.

What is claimed is:

1. A bolt guard assembly for use in separating a fastener used in joining treated wood product members from the treated wood members, said bolt guard assembly comprising:

a central sleeve, said sleeve being freely sildably positionable in aligned bores formed in the treated wood product members; said central sleeve having an inner dimension greater than a shank portion of the fastener;

a first end cap having a fastener head receiving pocket, and a first barrel, said first barrel having a free end which is slidingly telescopingly positionable within a first end of said central sleeve;

a second end cap having a fastener nut receiving pocket, and a second barrel, said second barrel having a free end which is slidingly telescopingly positionable within a second end of said central sleeve; said central sleeve and said first and second end caps being made of a material impermeable to the treated wood products and preventing the fastener from being contacted by the treated wood products, said central sleeve having a length such that at least said first or said second end of said sleeve is spaced from said fastener head receiving pocket or said fastener nut receiving pocket when said bolt guard assembly is in use.

2. The bolt guard assembly of claim 1 wherein said central sleeve is tubular.

3. The bolt guard assembly of claim 2 wherein said barrels of said first and said second end caps are tubular.

4. The bolt guard of claim 3 wherein free ends of said first and second end cap barrels are crimped.

5. The bolt guard assembly of claim 1 wherein said fastener head receiving pocket includes a generally planar fastener head receiving member having an upstanding fastener head receiving member rim.

6. The bolt guard assembly of claim 5 wherein said fastener head receiving member rim extends from said fastener head receiving member generally opposite to said first barrel.

7. The bolt guard assembly of claim 1 wherein said fastener nut receiving pocket includes a generally planar fastener nut receiving member having an upstanding fastener nut receiving member rim.

8. The bolt guard assembly of claim 7 wherein said fastener nut receiving member rim extends from said fastener nut receiving member generally opposite to said second barrel.

9. The bolt guard assembly of claim 1 wherein said central sleeve, said first end cap, and said second end cap are formed of plastic.

10. A bolt guard assembly for use in separating a fastener used in joining treated wood product members from the treated wood members, said bolt guard assembly comprising:

a central tubular sleeve, said sleeve being positionable in aligned bores formed in the treated wood product members; said central sleeve having an inner diameter greater than a shank portion of the fastener;

a first end cap having a fastener head receiving pocket, and a first tubular barrel having a crimped free end which is telescopingly positionable within a first end of said central sleeve;

a second end cap having a fastener nut receiving pocket, and a second tubular barrel having a crimped free end which is telescopingly positionable within a second end of said central sleeve; said central sleeve and said first and second end caps being made of a material impermeable to the treated wood products and thereby preventing the fastener from being contacted by the treated wood products.

* * * * *